(12) United States Patent
McEwen et al.

(10) Patent No.: US 6,366,418 B1
(45) Date of Patent: Apr. 2, 2002

(54) METHOD FOR REDUCING DATA OVERHEAD IN PRML DATA CHANNEL

(75) Inventors: Peter McEwen, Santa Clara; Murat Erkocevic, San Jose, both of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/346,764

(22) Filed: Jun. 30, 1999

(51) Int. Cl.[7] ................................................. G11B 5/09

(52) U.S. Cl. .............................. 360/48; 360/65; 360/46

(58) Field of Search ............................ 360/48, 65, 46, 360/77.08, 78.04

(56) References Cited

U.S. PATENT DOCUMENTS

| | | | | |
|---|---|---|---|---|
| 4,554,598 A | * | 11/1985 | Tarbox et al. | 360/48 |
| 5,521,945 A | | 5/1996 | Knudson | 375/341 |
| 5,606,466 A | * | 2/1997 | Fisher et al. | 360/51 |
| 5,844,738 A | | 12/1998 | Behrens et al. | 360/44 |

OTHER PUBLICATIONS

R. Behrens and A Armstrong, "An Advanced Read/Write Channel for Magnetic Disk Storage", *IEEE Twenty–Sixth Asilomar Conf. on Signals, Systems & Computers,* vol. 2, pp. 956–960, Oct. 1992.

* cited by examiner

*Primary Examiner*—David Hudspeth
*Assistant Examiner*—Dan I. Davidson
(74) *Attorney, Agent, or Firm*—Michael Zarrabian

(57) ABSTRACT

A method reducing data format overhead in a storage device. A sequence detector includes a series of states and a path memory of predetermined length. This method includes steps of writing a predetermined shortened pad pattern at the end of a user data field pattern to a signal-degrading storage medium such as magnetic tape or disk; generating samples during read back of the user data field pattern and the shortened pattern; and, controlling the sequence detector during receipt of pad samples to converge at only one or several predetermined detector states during a convergence sequence. The convergence sequence, and the detector pad are shorter than a sequence needed to traverse the entire length of the path memory. The final state reached during the sequence can be used to provide an accurate estimate of a last user data bit of the user data field pattern.

14 Claims, 4 Drawing Sheets

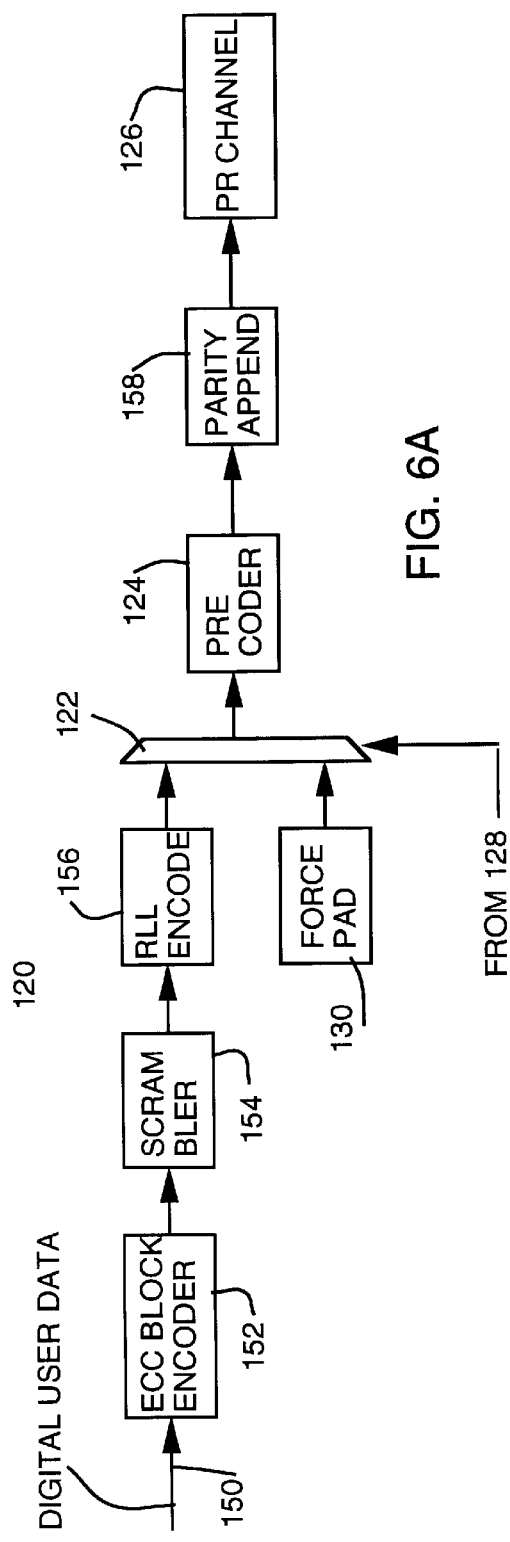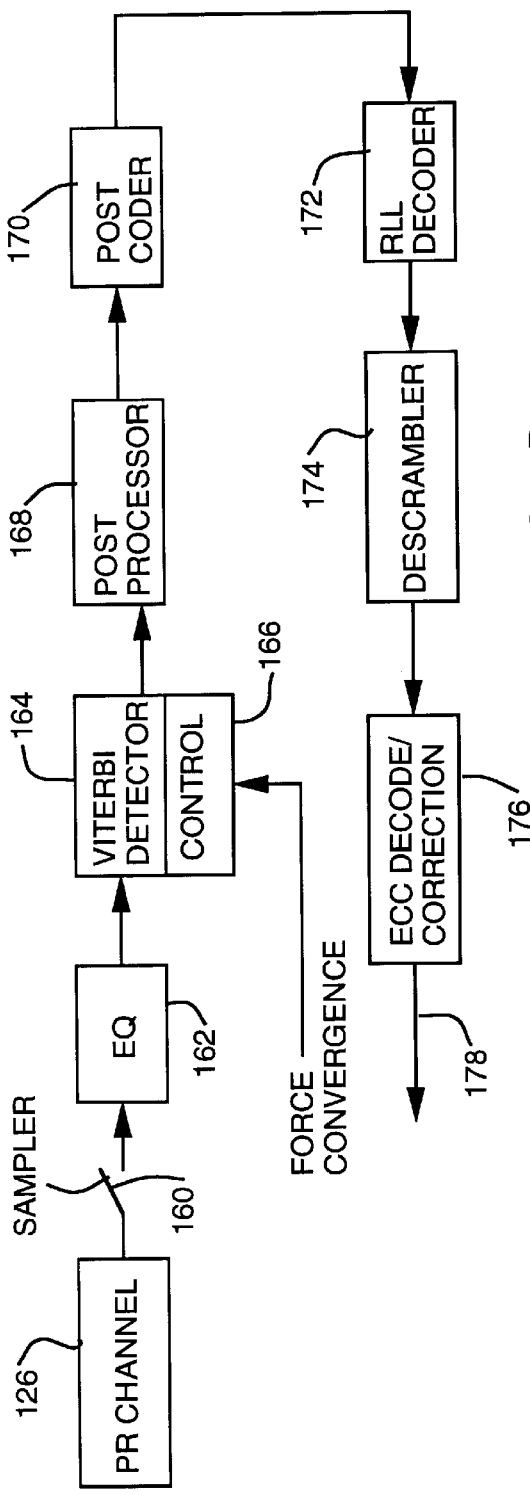

METHOD FOR REDUCING DATA OVERHEAD IN PRML DATA CHANNEL

FIELD OF THE INVENTION

This invention relates generally to digital data storage channels and devices. More particularly, the present invention relates to a method for reducing sequence detector pad length within a partial response maximum likelihood data channel.

BACKGROUND OF THE INVENTION

In order to achieve higher recording densities, designers of magnetic recording channels have switched from analog peak detection techniques to sampled data detection techniques. In sampled data detection systems, the readback signal is filtered and sampled at a channel rate of 1/T, where T is the duration of a channel symbol. One such technique employs what is known as a partial response maximum likelihood (PRML) system. When PRML is employed, magnetic transition densities on the recording medium may be increased by as much as 20% to 30% over peak detection recording and playback methods, since PRML more robustly tolerates some transition pulse overlap (intersymbol interference) than can resolved with peak detection techniques. Also, in the process of peak detection, the readback signal is differentiated in order to locate signal zero crossover locations. Differentiation amplifies higher frequencies which contributes additional noise to, and increased errors in, the readback signal. The synchronous sampling process employed in PRML quantizes signal amplitudes at specific intervals throughout each readback transition interval T without requiring determination of zero crossings, thereby eliminating the differentiation step and resultant noise enhancement.

One widespread PRML system uses filters to equalize the readback signal to a partial response class 4 (PR4) signal. The discrete-time transfer function of a PR4 channel is $(1-D)^2$, where D represents a unit-time delay operator with unit-time T. In an idealized PR4 channel, a noiseless output is equal to the input signal minus a version of the input signal delayed in time by 2T. In a practical PR4 channel, the output of the noisy partial response channel is sampled at the channel rate and detected using a sequence detector, such as a Viterbi detector. Typically, the Viterbi detector is designed for maximum-likelihood detection of the sampled partial response channel in additive, independent, and identically distributed Gaussian noise with zero mean.

While PR4ML channels have been widely used in magnetic recording and playback systems for data densities at or below two channel symbols per pulse width at half maximum amplitude (PW50/T≦2.0) the PR4 spectnim has satisfactorily matched the magnetic recording channel. However, at normalized data densities above PW50/T=2.0, other partial response models have been discovered to provide a better match to the magnetic recording channel characteristics. These partial response models include EPR4 with a discrete-time transfer function of $(1-D)(1+D)^2$ or $(1+D-D^2-D^3)$ and EEPR4 with a discrete-time transfer function of $(1-D)(1+D)^3$ or $(1+2D-2D^3-D^4)$. Other partial response models are also known, such as NPR having a unit pulse response of e.g. $7+4D-4D^2-5D^3-2D^4$.

Once a channel model is selected, a sequence detector may be fashioned. Sequence detectors frequently implement a version of the Viterbi algorithm. Typically the Viterbi detector is designed for maximum likelihood detection of the sampled partial response channel in additive, independent, and identically distributed Gaussian noise with zero mean. The Viterbi algorithm minimizes squared Euclidean distance between the sequence of noisy samples and all possible sequences of idealized noiseless samples in accordance with the particular channel model. The Viterbi algorithm is an iterative process of keeping track of the path with the smallest accumulated metric leading to each state. The metrics of all of the paths leading into a particular state are calculated and compared. Then, the path with the smallest metric is selected as a survivor path and the other pathsare discarded. In this manner all paths which are not part of the minimum metric path are systematically eliminated. The survivor path to each state is stored in a path memory. Given that the path memory is made sufficiently long, all of the selected survivor paths will diverge from a single path within the span of the path memory. The single path from which all the current survivor paths diverge is the minimum metric path. The Viterbi detector then traces back along the path memory to find the convergence state. The input sequence associated with the single minimum metric path then becomes the most-likely symbol output of the Viterbi detector.

A Viterbi detector does not attempt to decide whether a transition has occurred upon receipt of a readback sample or samples taken from a particular transition. Rather, samples are taken from the readback signal and equalized to the target channel model. The Viterbi detector then keeps a running tally of the error between the actual sample sequence and a correct sample sequence, i.e. a sequence that would be expected if the recording medium had been written with a particular sequence of transitions. One way of visualizing the Viterbi detector path memory is by way of a trellis diagram having plural states and plural paths leading from each state to other states. As analog-to-digital samples ($y_k$) are fed into one end of the trellis, estimates of previous bits are put out at an opposite end of the trellis. An error metric is determined for each one of plural possible state transition sequences. As more samples come into the Viterbi detector, less probable transition sequences (paths) are eliminated, and by tracing back along the trellis a most likely path emerges as a convergent set of paths and enables a most-likely data decision to be made by the Viterbi detector.

The magnetic recording channel is not an ideal channel. Rather, noise, media defects, non-linear response of the playback element and other distracting influences may result in distortion of or error in the readback<signal. Therefore, error events can, and do, occur. When sequence detection is employed, error events may result in a most likely path being selected by the Viterbi detector which diverges from the correct path. Coding constraints are frequently employed in order to limit burst error lengths, so that the trellis (path memory) can be made with a practical maximum number of states. However, in any sequence detector, such as a Viterbi detector, the trellis will have multiple states and must receive multiple samples before it can reach its decision as to each most likely path, and therefore each most likely binary data value (one or zero) to put out.

Examples of magnetic recording and playback channels employing PRML are found in commonly assigned U.S. Pat. No. 5,521,945 to Knudson, entitled: "Reduced Complexity EPR4 Post-Processor for Sampled Data Detection"; and U.S. Pat. No. 5,844,738 to Behrens et al., entitled: "Synchronous Read Channel Employing a Sequence Detector with Programmable Detector Levels". A paper by R. Behrens and A. Armstrong, entitled: "An Advanced Read/Write Channel for Magnetic Disk Storage", *IEEE Twenty-Sixth Asilomar Conf. on Signals, Systems & Computers*, Vol. 2, pp. 956–960, October 1992, also provides useful background information concerning a number of issues relating to PRML.

In magnetic data storage devices, such as hard disk drives for example, user data is typically stored in blocks or sectors defined within a data track. Tracks may be a single spiral track as in optical recording, or may be a multiplicity of discrete concentric tracks as is the practice in magnetic disk recording. Each data sector typically begins with certain overhead information which may include a synchronization field, an address mark pattern enabling data blocks to be properly framed, a data field of user data bytes and ECC syndrome bytes, and a pad field. Since the sequence detector uses path metrics and multiple states in arriving at each data decision, it has heretofore been necessary to include sufficient pad bits in the pad field at the end of each sector or data block in order to propagate the last user data or ECC sample through the detector trellis. The number of pad bits required to flush the path memory of the sequence detector depends primarily upon the Euclidean distance properties of the target model. If the detector pad could be reduced in size, each data sector could be made smaller, enabling a greater number of sectors to be recorded on the magnetic disk surface.

Therefore, a hitherto unsolved need has remained for a method for reducing the amount of sequence detector pad in a data block format without loss of user data and in a manner overcoming limitations and drawbacks of prior designs and methods.

SUMMARY OF THE INVENTION WITH OBJECTS

A general object of the present invention is to reduce the length of a sequence detector pad pattern within a partial response, maximum-likelihood recording and playback channel in a manner overcoming limitations and drawbacks of the prior art.

Another object of the present invention is to provide a simple and elegant way to control a sequence detector to arrive at a most-likely decision as to a last binary value of a user data field without having to traverse an entire length of a path memory of the sequence detector.

A further object of the present invention is to provide a shortened detector pad for inclusion within a data pattern written to a signal-degrading storage medium, the pad length being chosen to be equal to, or less than, the number of bits in a state of a sequence detector. If the pad length equals the number of bits in a state, there will be only one state of the sequence detector corresponding to the pad pattern. If the pad length is less than the number of bits in a state there will be more than one sequence detector state corresponding to the pad pattern (typically a very small number of states), and the pad pattern is chosen so that paths that diverge from a common state of the sequence detector and reach the small number of states that correspond to the pad pattern will have a large separation from each other in Euclidean distance.

In accordance with one aspect of the present invention, a method is provided for reducing data format overhead in a storage device including a sequence detector having a series of states and a path memory of predetermined length. This method includes the steps of writing a predetermined shortened pad pattern at the end of a user data field pattern to a signal-degrading storage medium of the device; generating samples during read back of the user data field pattern and the shortened pattern; and controlling a sequence detector during receipt of samples of the shortened pattern to converge to one or a small number of predetermined states of the sequence detector during a convergence sequence having a length less than a sequence needed to traverse a length of a path memory of the sequence detector. The shortened detector pad pattern is selected so that paths that diverge from a common state of the sequence detector and reach the small number of predetermined states have a large separation from each other in Euclidean distance, thereby enabling accurate selection of a most likely path to the one state indicating a most likely estimate of a user data field last bit value. Most preferably, the storage device is a magnetic recording and playback device, and the signal-degrading storage medium comprises a magnetic storage medium such as a disk or tape, and the user data field pattern is scrambled to randomize a magnetic pattern recorded onto the magnetic storage mediuim, and the step of writing the predetermined shortened pad pattern is carried out without scrambling of the shortened pad pattern.

In accordance with another aspect of the present invention, a magnetic data storage device, such as a magnetic hard disk drive, or magnetic tape drive, implements partial response maximum-likelihood sampling data detection in a manner reducing data storage overhead. The device includes a write channel for writing a predetermined shortened pad pattern at the end of a user data field pattern to a magnetic storage medium of the device, and a read channel for generating synchronous samples during read back of the user data field pattern and the shortened pad pattern. The device further includes a sequence detector for determining sequences of most likely data symbols during receipt of samples and having a predetermined path memory length. The sequence detector includes control logic for controlling the sequence detector during receipt of samples of the shortened pad pattern so as to cause memory path convergence to only one or a small number of predetermined states of a series of possible detector states during a path convergence sequence having a duration less than duration of a path sequence needed to traverse a full length of the memory path of the sequence detector. The resultant state(s) can be used to obtain a most likely estimate of a user data field last bit value. Preferably, the control logic includes circuitry for eliminating any path along the detector memory path not leading to the resultant state(s). Also, the device's write channel may include a precoder which puts out an output value $Y_k$ which is equal to $Y_{k-1}$, XOR $X_k$, where $X_k$ is the input value. In this case the shortened pad pattern comprises a sequence of binary zeros selectively applied to the input of the precoder during a writing sequence for writing the shortened detector pad pattern.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 6A is an electrical block diagram of a write channel of a magnetic storage device, and FIG. 6B is an electrical block diagram of a read channel of the magnetic storage device, incorporating principles of the present invention.

DETAILED DESCRIPTION OF PREFERRED EMBODIMENTS

A sequence detector, such as a Viterbi detector, includes a path memory. The present invention will be described as an example of a read/write channel for a disk drive which includes a generic $2^S$-state sequence detector with a latency or path length of L bits. For example an existing read/write channel for a magnetic disk drive has a sequence detector where S equals 4 and L equals 12. A latency of L bits means that normally the maximum length of the competing paths through the trellis before they merge is L bits (L bit clock cycles). A trellis diagram is obtained by adding a time axis to a sequence detector state diagram. Without using the principles of the present invention, one would have to append L bits (12 bits) of pad to the end of every data sector in order to guarantee that the paths merge regularly for the last user data bit. These L pad bits represent overhead on the storage medium and take up space otherwise available for storing more user data.

The present invention reduces the length of the detector pad from L bits to a predetermined number of pad bits equal to or less than S bits, where S is equal to the number of sequence detector states. This method is implemented by writing an unencoded fixed bit pattern of length equal to or less than S following the last user data bit within the block or sector format of the storage device. Then, during a subsequent readback process, at the moment when the last customer data sample is latched into the sequence detector, special logic forces selection of competing paths along the trellis which will result in convergence to a state or states defined by the particular detector pad bit pattern written to the medium. In accordance with principles of the present invention, if the detector pad length is equal to S, then only sequence detector state corresponds to the pad binary pattern. If the detector pad length is made less than S, then there will be a few plural states that correspond to the pad sequence. Accordingly, for pad lengths less than S, the pad pattern is chosen so that paths along the detector trellis which diverge from a common state and reach these few plural states should have a large separation from each other Euclidean distance, so that the sequence detector may make an accurate selection of the most likely path through the trellis.

Figure 1:
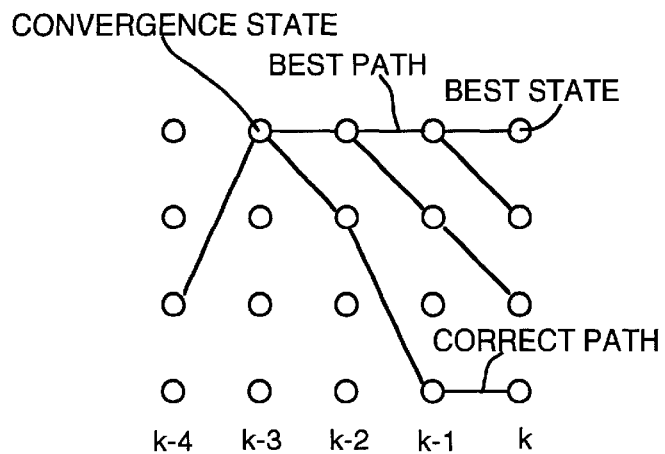
FIG. 1 is a path memory trellis for a partial response polynomial of predetermined length.

FIG. 1 illustrates a path memory as a two-dimensional trellis for a partial response polynomial of length $h(D)=1+\alpha D+\beta D^2$, or S equals 2 and L equals length 12, for example. In the FIG. 1 example each horizontal row of the trellis represents a particular state vector. For example, the top row has a state vector of 11, the next row a state vector of 10, the third row a state vector of 01 and the lowest row a state vector of 00. The paths through the trellis represent all possible sample sequences. The rightmost column of states represents states and paths from the most recently entered data samples. The leftmost column of states represents the oldest or least recent paths.

In the FIG. 1 example there are four states and four trellis depths between states established by five bit clock intervals, from right (oldest) to left (newest), k, k−1, k−2, k−3 and k−4. At every depth or level of the trellis, a trace back is made from each state by determining a path metric. In one preferred form the path metric is the sum of mean squared error on the particular path. Tile path metric identifies a best state and a best path, as labeled in FIG. 1. There are multiple paths extending along the FIG. 1 trellis. During each clock cycle the FIG. 1 Viterbi detector updates the four state metrics and selects one of the paths as a survivor path for each of the four states. The survivor path represents the path having the minimum path metric leading to a particular state, and the state metric represents the metric associated with that path. In order to update the state metrics, the detector extends the survivor paths to obtain two paths to each state in the next trellis depth. Each path metric is obtained by adding a state metric to a branch metric, where the branch metric represents the squared Euclidean distance between the current noisy sample and the noiseless sample associated with the branch. In the FIG. 1 example with four states, during each bit clock cycle, eight path metrics are calculated and four comparisons are carried out in order to select the survivor paths.

The path memory length is selected such that if the plural paths are traced back far enough, for example over a trellis depth or memory path length of 12 clock cycles, all survivor paths will be found to converge at a single state. If one were to trace back (right to left) along the trellis, eventually all of the survivor paths would converge at the same state. The reason that such convergence is beneficial is that it enables the Viterbi detector to select and output a most likely binary bit of a particular symbol corresponding to the survivor state. In the FIG. 1 example, all survivor paths trace back to a point of convergence at a single state (11) at time k−3.

The sequence detection process therefore has an inherent delay. In order to make use of correlation between a/d samples, the sequence detector cannot make a final decision as to a most likely symbol sequence until all of the survivor paths are found to be merged into a single state, typically at the end of the path memory trellis (e.g. 12 clock cycles later than the presently entering data sample). In order to make sure that the paths merge for a last bit of the user data field, tie conventional approach has been to extend the data field by adding otherwise unnecessary data pad or fill, such as 12 binary bits in the detector pad field following the data/FCC field of the data sector. For example, in magnetic storage devices using sequence detection, this full detector pad results in a loss of space on the storage medium. In hard disk drives, the present invention saves at least one byte (eight serial binary bits) per data sector thereby increasing the space available for storing riser data and increasing storage capacity by typically at least 0.2%.

Figure 2:
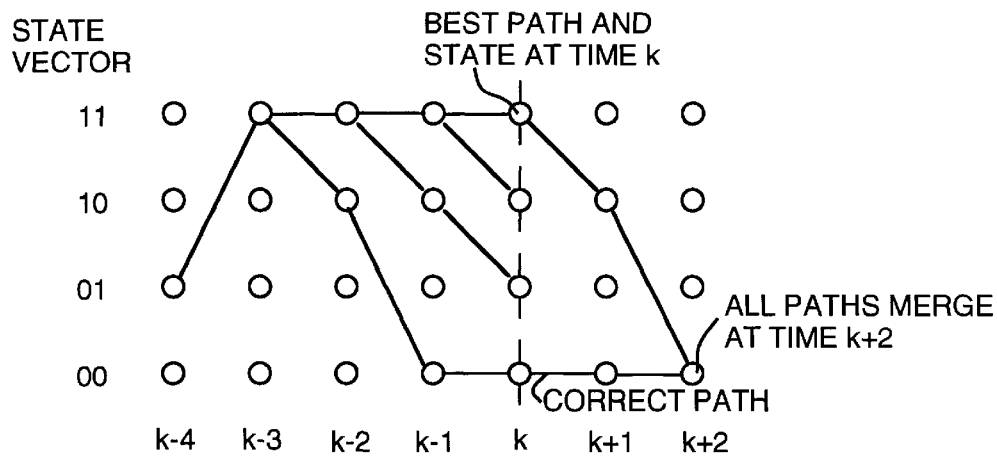
FIG. 2 is another example of a path memory trellis for a partial response polynomial of predetermined length.

Turning now to FIG. 2, the states and paths of FIG. 1 are reproduced as well as states at two additional times, k+1 and k+2. In the FIG. 2 example, a shortened detector pad of 00 is used. Samples corresponding to the shortened detector pad are fed into the trellis at time k and k+1. As shown, only the detector trellis state (00) is allowed at time k+2. The detector pad sequence forces all paths to state (00) at bit (clock time k+2. Therefore, in only two bit clock periods, the sequence detector will be able to decide whether the last symbol of the user field is a zero or is a one. In the present example the detector pad length has thereby been reduced from 12 bits to two bits.

Further, the two-bit pad of the FIG. 2 example forces the incorrect paths along the detector trellis to acquire more distance. The term "distance" is also referred to as the sum of the branch metrics, where each branch metric has all approximate form of $(y-d)^2$, where y is the received A/D sample, and d is the ideal sample. As the received A/D sample approaches the ideal sample value, the branch metric will diminish noonlinearly by a power of two. Therefore, on the correct path the branch metric should be quite small. As the best path gets farther away from the correct path, the branch metric becomes the square of the difference between the two values. (The similarity or proportionality in a particular implementation is dependent upon the particular branch metric calculational refinements, and is subject to rounding off and saturation, and lookup table approximations, etc.).

Since the best path in the FIG. 2 example is not the correct path at time k, it is very desirable to increase the distance of the best path when it merges with the correct path at time k+2 at state (00). This approach enables the sequence detector to decide the final bit at time k+2, rather than having to wait until e.g. time k−10 to make the decision. Ten clock cycles (and 10 bits) are saved by using the FIG. 2 approach.

Figure 3:
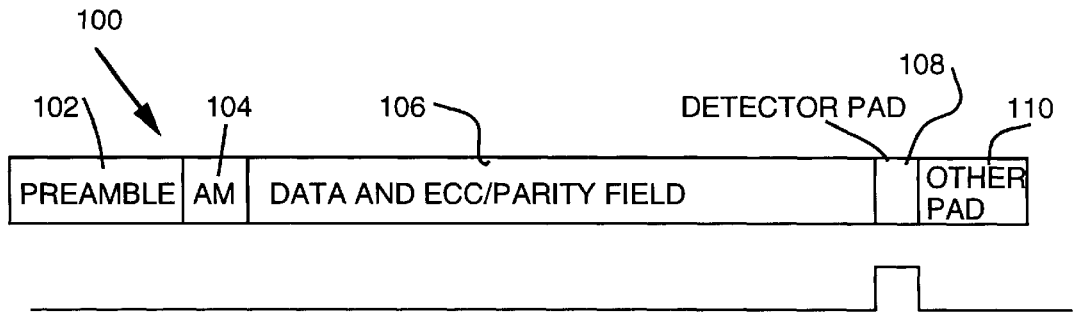
FIG. 3 is a diagram of a user data block format having a shortened detector pad field in accordance with principles of the present invention.

FIG. 3 provides a simplified example of a data sector 100 recorded serially onto a circular track of a data storage surface of a rotating magnetic storage disk. As recorded, the data lies within an arcuate track locus; it is shown lineally in FIG. 3 for drawing simplicity. As recorded onto the data track, the data sector begins with a preamble field 102. The preamble field 102 typically comprises a known periodic pattern which, when read back from the disk surface, enables the read channel to normalize its timing, gain, and DC offset settings for the particular sector 100, for example. An address mark field 104 (AM) is then read and used by a data controller of the disk drive in order to flame the user data into user bytes or data symbols, by starting a byte clock in synchronism with playback of the recorded user data pattern in a data/ECC field 106. Encoded and scrambled user data (including appended ECC, crosscheck and or parity values) then follows in the data field 106 for a substantial extent of the sector. The data/ECC values are typically scrambled so that the written data pattern is randomized. Also, the data may be encoded in accordance with a run-length code or other code in order to assure accurate timing recovery.

In accordance with principles of the present invention, a shortened detector pad field 108 follows the data/ECC field 106. The shortened detector pad field 108 is then followed by a sector-ending pad field 110 which includes any other pad needed for proper operation of the particular digital readback channel. For example, if the channel includes a digital finite impulse response (FIR) filter, the FIR filter must continue to receive valid samples following samples of the last user/ECC transition read from the data field 106 in order to satisfy the memory length requirements of the particular digital FIR filter.

In one presently preferred example, a 16-state sequence detector having a memory path length of 12 sample clock intervals is employed. Ordinarily, it is necessary to provide 12 extra samples following the last user data sample in order to be able to trace back twelve clock intervals along the memory path trellis in order to find a convergence state. In accordance with principles of the present invention, a known pattern is written in the shortened detector pad field 108, and the best one of two sequence detector states (0000) or (1111) is chosen after four sample clock intervals, rather than 12 sample clock intervals. Unlike the user/ECC values of the data field 106, the short data pattern in the detector pad field 108 is not scrambled or encoded.

Figure 4:
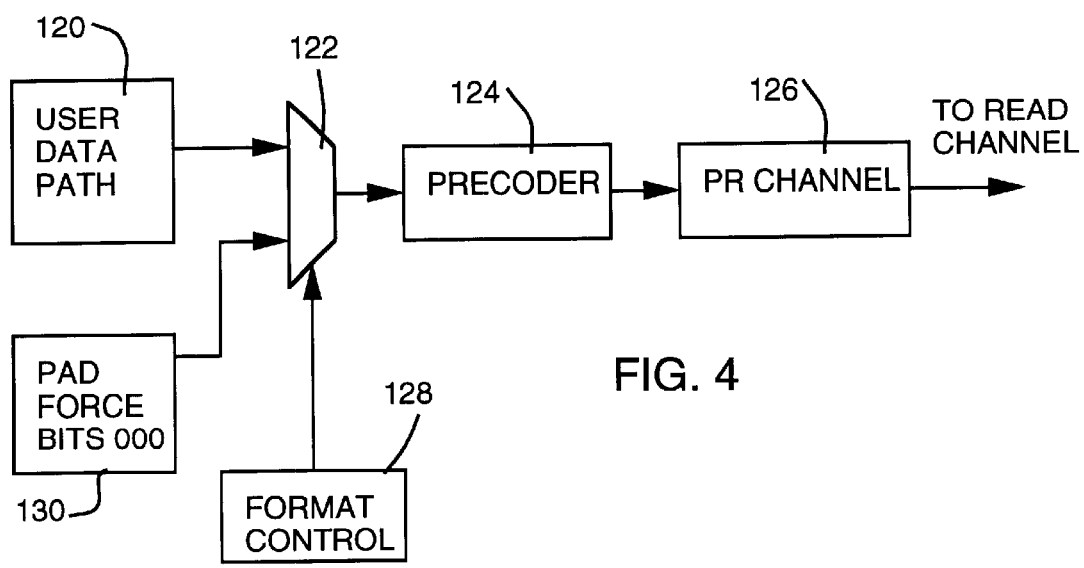
FIG. 4 is a simplified electrical block diagram of a method for forcing pad bits of known value into the shortened detector pad field of the FIG. 3 user data block format.

FIG. 4 presents a simplified circuit block diagram of a method for generating the known pattern during a sector recording operation of a disk drive, for example. A user data path 120 provides encoded and scrambled user binary data values through a selector 122 to a precoder 124. The output of the precoder 124 is $Y_k=Y_{k-1}$ XOR $X_k$, where $X_k$ is the input. The output of the precoder 124 then passes through a signal-degrading medium of a partial response channel 126, such as a magnetic storage disk or tape. At the end of the user data field 106, control logic 128 responds to a sector byte count by generating a selector enable control signal, graphed below sector 100 in FIG. 3, which causes the selector 122 to switch its output from the user data path 122 to a pad bit source 130. The pad bit source 130 then inputs a known bit pattern such as three binary zeros to the input of the precoder 124.

There are two possible output values from the precoder at each bit clock interval, either a one or a zero. The last user/ECC data bit, $Y_{k-1}$, can be either a one or a zero. If $Y_{k-1}$ is a one, then, when the three zeros from source 130 are fed in, the precoder 124 will put out a pattern of four binary ones. On the other hand, if $Y_{k-1}$ is a zero, then the precoder 124 will put out a pattern of four binary zeros. In either case during encoding of the pad field 108, $X_k$ is 000. (The forced-zero input means that the $X_k$ ten is essentially not present; thus, the precoder output will depend solely on the state of the last user bit, $Y_{k-1}$). The shortened detector pad field therefore will be recorded with three binary ones, or three binary zeros, depending upon the logical state of the last user/ECC data bit.

Figure 5:
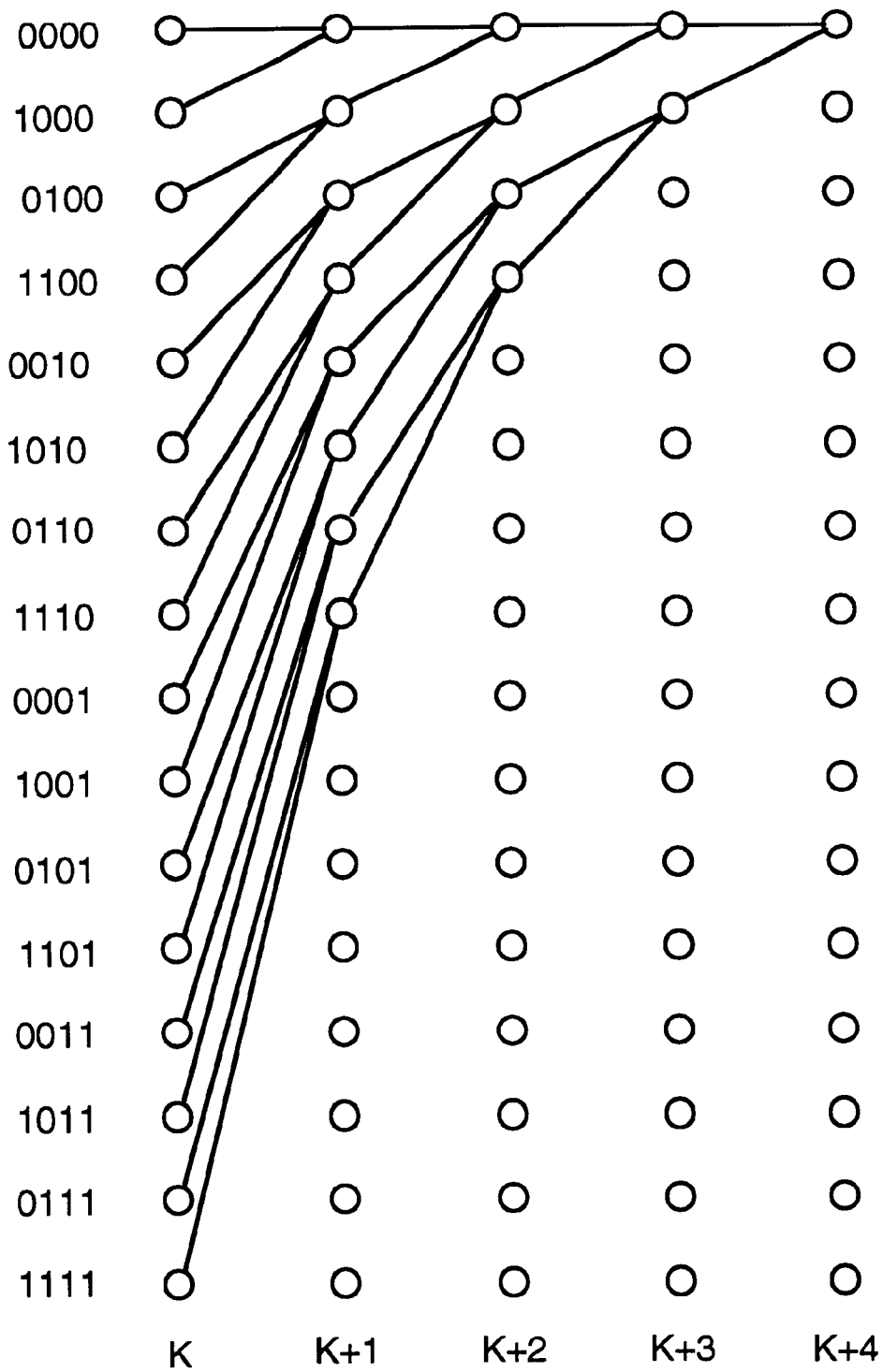
FIG. 5 is a diagram of a 16 state path memory trellis showing forced convergence of all paths to a single state in four sample clock intervals in accordance with principles of the present invention.

When samples of the 1111 or 0000 data pattern reach a sequence detector, the 16-state sequence detector is forced to select the best state between state (1111) or state (0000) in only four sample intervals. FIG. 5 shows all survivor paths to detector state (0000). A complementary pattern of survivor paths will occur to detector state (1111). Logic circuitry within the sequence detector is triggered which causes all paths to be discarded which do not converge toward either detector state (1111) or detector state (0000). Therefore, in the example of a 16-state sequence detector having a path length of 12, convergence at the end of the user/ECC field 106 occurs after only four sample intervals, rather than after 12 sample intervals. Since the most significant bit of the detector symbol (1111) or (0000) corresponds to the last user/ECC data bit, the detector puts out either a one or a zero, as the case may be.

FIG. 6A shows a more detailed block diagram of a write channel for a partial response system, such as a magnetic hard disk drive. The user data path 120 is shown to include a source 150 of serial user data, typically from a drive interface and host computer (not shown). The serial data is then ECC block/interleave encoded in conventional manner in an ECC encode block 152, and then scrambled in a scrambler block 154. Following scrambling, the data symbols are then run-length encoded by a RLL encoder and then passed through the selector 122 and precoder 124, as explained in connection with FIG. 4. A parity-append block 158 is then provided to append a parity symbol onto each RLL-encoded block, for example. The resultant binary pattern is then passed through the partial response channel 126, as for example, a write current applied to a magnetic write element of a transducer head passing over a selected track location of a magnetic storage disk (not shown). The transducer head then transduces the write current into a saturation magnetic field which aligns magnetic domains of the disk passing under the head at the moment. When the current direction reverses, the magnetic domains reverse and a flux transition occurs. Further details of a disk drive using partial response, maximum-likelihood data detection are to be found in commonly assigned U.S. Pat. No. 5,341,249 to Abbott, et al., entitled: "Disk Drive Using PRML Class IV Sampling Data Detection with Digital Adaptive Equalization", the disclosure thereof being incorporated herein by reference.

FIG. 6B shows a read channel of the disk drive of FIG. 6A. The read channel includes a synchronous sampler 160 for synchronously sampling an analog readback signal from a read element of the transducer head. The analog readback signal is then subjected to equalization to the target partial response model or spectrum by passing through a digital equalizer 162, such as a FIR filter. In practice read channel equalization of the analog readback signal may occur in lieu or in addition to the digital equalization performed by equalizer 162. The equalized samples then pass into a sequence detector 164, such as a Viterbi detector. The Viterbi detector 164 includes special logic circuitry 166 implementing the method of the present invention. A post-processor 168 may follow the sequence detector 164, and it puts out most likely estimates of the original write current pattern. Other conventional elements of the read channel include a postcoder 170 which operates as an inverse of the precoder 124. A RLL decoder 172 then decodes the RLL encoded blocks. A descrambler 174 removes the scrambling imposed upon the samples by the scrambler 154, and an ECC block decoder and error correction circuit 176 checks the ECC syndrome bytes appended to the user data field or interleave by the ECC block encoder 152 and performs data block correction as may be required, in conventional fashion. A serial binary read back sequence is then put out on a path 178 which can return the sequence to the lost computer or other unit requesting the data via the disk drive controller and drive interface.

The logic control 166 within the Viterbi detector 164 operates similarly to the selector 122, by causing the Viterbi detector 164 to eliminate all paths not leading towards states (1111) or (0000) when the samples of the last user bit and detector pad bits enter the detector trellis. A force convergence control, similar to tile waveform shown below the sector 100 in FIG. 3, is generated within the read channel based upon a sector count synchronized upon readback of the address mark 104 of the sector being read. The sector count enables location of the last user data value $Y_{k-1}$ and the following shortened detector pad field 108. The paths within the Viterbi detector 164 thereupon quickly converge to state (1111) or state (0000) as shown in FIG. 5. Then, the detector can put out either a one or a zero as the last user data value $Y_{k-1}$.

While a present example has been provided in connection with a 16-state sequence detector having a memory path length of 12, those skilled in the art will appreciate that the present method may be used to shorten pad fields for sequence detectors of different state sizes and path lengths, and without a precoder/postcoder in the partial response channel.

Although the present invention has been described in terms of the presently preferred embodiment of a partial response maximum-likelihood channel within a magnetic hard disk drive, it should be clear to those skilled in the art that the present invention may also be utilized in conjunction with, for example, other storage devices, and signaling systems and channels. Thus, it should be understood that the instant disclosure is not to be interpreted as limiting. Various alterations and modifications will no doubt become apparent to those skilled in the art after having read the above disclosure. Accordingly, it is intended that the appended claims will be interpreted as covering all alterations and modifications as fall within the true spirit and scope of the invention.

What is claimed is:

1. A method for reducing data format overhead in a storage device including a sequence detector having a series of states and a path memory of predetermined length, the method including the steps of:

writing a predetermined shortened pad pattern at the end of a user data field pattern to a signal-degrading storage medium of the device, generating samples during read back of the user data field pattern and the shortened pattern, and controlling the sequence detector during receipt of samples of the shortened pad pattern to converge to only one or a small number of predetermined states of the sequence detector during a convergence sequence shorter than a sequence needed to traverse the length of the path memory, such that the convergence sequence provides a most likely estimate of a last user data bit of the user data field pattern, and such that the predetermined shortened pad pattern is selected so that paths that diverge from a common state in the sequence detector and reach said small number of predetermined states have a large separation from each other in Euclidean distance thereby enabling accurate selection of a most likely path to a state providing a most likely estimate of a last user data bit of the user data field pattern.

2. The method for reducing data format overhead in a storage device set forth in claim 1 wherein the storage device is a magnetic recording and playback device, wherein the signal-degrading storage medium comprises a magnetic storage medium, and wherein the user data field pattern is scrambled to randomize a magnetic pattern recorded onto the magnetic storage medium, and wherein the step of writing the predetermined shortened pad pattern is carried out without scrambling of the pad pattern.

3. The method for reducing data format overhead in a storage device set forth in claim 1 wherein said small number of predetermined states comprises one state of said sequence detector.

4. The method for reducing data format overhead in a storage device set forth in claim 1 wherein said small number of predetermined states comprises two states of said sequence detector.

5. A method for operating a data storage device in a manner reducing data storage overhead, the method comprising steps of:

writing a predetermined shortened detector pad pattern at the end of a user data field pattern to a signal-degrading storage medium of the device, generating samples during read back of the user data field pattern and the shortened pattern, and controlling a sequence detector during receipt of samples of the shortened pad pattern to converge to one or a small number of predetermined states of the sequence detector during a convergence sequence having a length less than a sequence needed to traverse a length of a path memory of the sequence detector, the shortened detector pad pattern being selected so that paths that diverge from a common state of the sequence detector and reach said small number of predetermined states have a large separation from each other in Euclidean distance thereby enabling accurate selection of a most likely path to a state providing a most likely estimate of a user data field last bit value.

6. The method for operating a data storage device set forth in claim 5 wherein the sequence detector puts out maximum-likelihood estimates of the user data field pattern in accordance with the Viterbi algorithm.

7. The method for reducing data format overhead in a storage device set forth in claim 5 wherein said small number of predetermined states comprises one state of said sequence detector.

8. The method for reducing data format overhead in a storage device set forth in claim 5 wherein said small number of predetermined states comprises two states of said sequence detector.

9. A magnetic data storage device using partial response maximum-likelihood sampling data detection with reduced data storage overhead, comprising:

a write channel for writing a predetermined shortened detector pad pattern at the end of a user data field pattern to a magnetic storage medium of the device, a read channel for generating synchronous samples during read back of the user data field pattern and the shortened pad pattern, and including a sequence detector for determining sequences of most likely data symbols during receipt of samples and having a predetermined path memory length, and control logic for controlling the sequence detector during receipt of samples of the shortened pad pattern so as to cause memory path convergence to only one or a small number of predetermined states of the sequence detector during a convergence sequence having a length less than a sequence needed to traverse the length of the path memory, the shortened detector pad pattern being selected so that paths that diverge from a common state of the sequence detector and reach said small number of predetermined states have a large separation from each other in Euclidean distance thereby enabling accurate selection of a most likely path to a state providing a most likely estimate of a user data field last bit value.

10. The magnetic data storage device set forth in claim 9 wherein the control logic includes circuitry for eliminating any path along the detector memory path not leading to the said predetermined states.

11. The magnetic data storage device set forth in claim 10 wherein said small number of predetermined states comprises one state of said sequence detector.

12. The magnetic data storage device set forth in claim 10 wherein said small number of predetermined states comprises two states of said sequence detector.

13. The magnetic data storage device set forth in claim 9 wherein the write channel comprises a precoder that puts out an output value $Y_k$ which is equal to $Y_{k-1}$ XOR $X_k$, where $X_k$ is the input value, and wherein the shortened pad pattern comprises a sequence of binary zeros selectively applied to the input of the precoder during a writing sequence for writing the shortened detector pad pattern.

14. The magnetic data storage device set forth in claim 13 wherein the sequence detector has 16 states and wherein the predetermined shortened detector pad pattern comprises binary 000.

* * * * *